(No Model.)
E. J. DE BERGUE.
BICYCLE BRAKE.
No. 567,949. Patented Sept. 15, 1896.
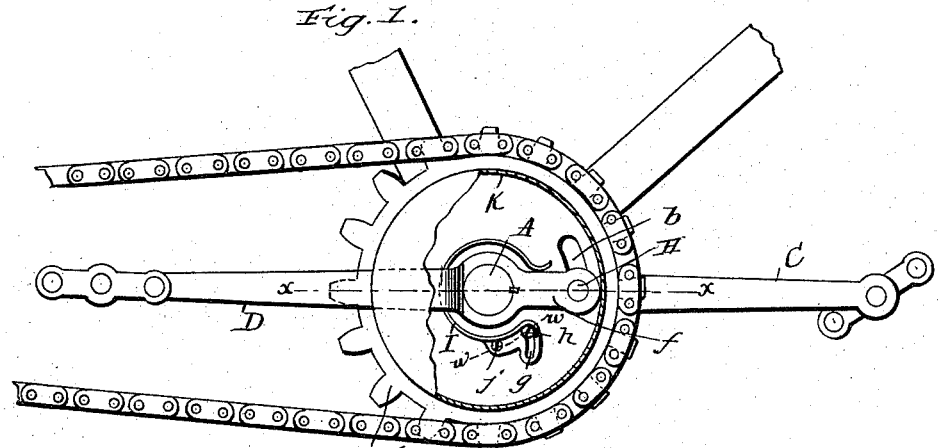
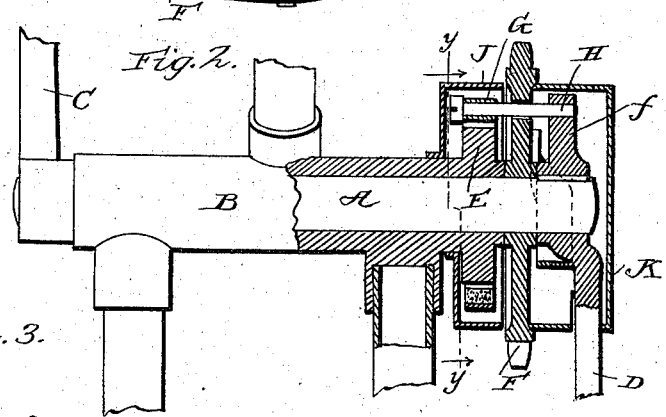
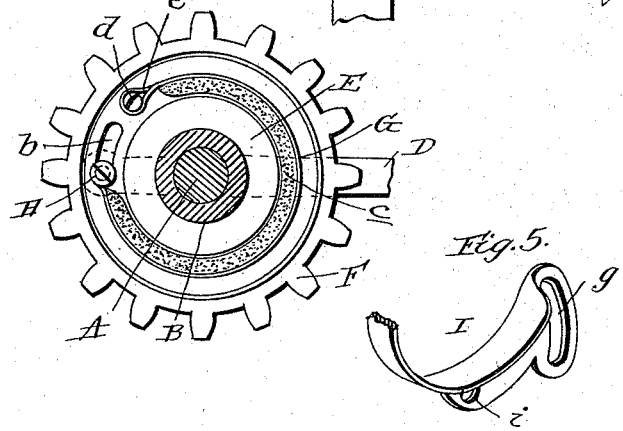
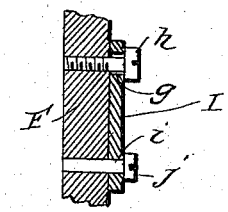
Witnesses
A. Raeder
W. A. James
Inventor
E. J. De Bergue
by James J. Sheehy
Attorney

UNITED STATES PATENT OFFICE.

EDWARD JOSEPH DE BERGUE, OF NEW ORLEANS, LOUISIANA.

BICYCLE-BRAKE.

SPECIFICATION forming part of Letters Patent No. 567,949, dated September 15, 1896.

Application filed March 14, 1896. Serial No. 583,201. (No model.)

*To all whom it may concern:*

Be it known that I, EDWARD JOSEPH DE BERGUE, a citizen of the United States, residing at New Orleans, in the parish of Orleans and State of Louisiana, have invented certain new and useful Improvements in Bicycle-Brakes; and I do declare the following to be a full, clear, and exact description of the invention, such as will enable others skilled in the art to which it appertains to make and use the same.

This invention relates to bicycles and other similar foot-propelled devices, and it has for its object to improve those devices which are provided with a brake for the driving parts and which require no particular attention or forethought from the rider to make an emergency stop, and may be easily and conveniently operated to make a gradual or slow stop, and may be also manipulated by the feet to retard the speed of the wheel without requiring the use of the hands or removal of the same from the handle-bar, which has been found so desirable in cases by cyclists, and particularly in cases of approaching accidents.

The invention and its many advantages will appear from the following description and claim when taken in conjunction with the annexed drawings, in which—

Figure 1 is a side view of a part of a bicycle with one of the dust-guards partly in section. Fig. 2 is a sectional view taken in the plane indicated by the dotted line $x\ x$ of Fig. 1. Fig. 3 is a sectional view taken in the plane indicated by the dotted line $y\ y$ of Fig. 2. Fig. 4 is a detail sectional view taken in the plane indicated by the dotted line $w\ w$ of Fig. 1, and Fig. 5 is a detail perspective view of the pressure-regulating spring.

Referring by letter to said drawings, A indicates the crank or pedal shaft, B the tube or sleeve thereon, C one pedal, and D the other pedal, all of which may be mainly of the construction usually employed. The sleeve B has formed on or suitably fixed to it a vertically-disposed friction disk or wheel E.

F indicates the chain or sprocket wheel which is arranged loosely on the shaft A, and is provided transversely at a suitable distance from its periphery with a curvilinear slot $b$, for a purpose which will presently appear.

G indicates a band or strap which may be made of spring-steel or other suitable material. This strap, which is designed to embrace the friction disk or wheel F, is faced on its inner side with leather, rawhide $c$, or other suitable material. The brake band or strap is secured at one end to the side of the chain-wheel F, adjacent to the said disk E, by means of a screw $d$, taking through a loop $e$ in said band or strap and into the wheel. It is obvious, however, that one end of this brake-band may be secured to the chain-wheel by other means. The opposite end of the band or strap G, after passing around the friction disk or wheel F, is secured to one end of a bolt or rod H, which bolt or rod takes through the curvilinear slot in the chain-wheel and is secured to the projected end $f$ of the pedal-lever D, as better shown in Fig. 2 of the drawings. The crank or pedal lever D differs from the lever C, in that it has the end $f$ projected beyond the shaft A to receive the bolt or rod H. It will be seen that the lever D causes the chain-wheel F to rotate through the medium of the bolt or rod H, engaging one end of the curvilinear slot in said wheel, and by said bolt engaging the wall at the opposite end of said slot will cause the chain-wheel to turn in an opposite direction on the shaft A.

In order that the pedal-levers may be held in proper positions while not in use and to overcome any casual tendency to apply the brake when it is not desirable to do so, I provide a spring I. This spring is secured at one end to the outer side of the chain-wheel F, and its opposite end is adapted to bear upon the projected end $f$ of the lever D, as better shown in Fig. 1 of the drawings, so as to normally hold the bolt or rod down in the curvilinear slot, as shown. This spring is adapted to be rendered adjustable, and is consequently of a peculiar construction, having at one end a branch provided with a curvilinear slot $g$ to receive an adjusting-screw $h$, which takes into the chain-wheel. This spring is curved so as to straddle the axle or shaft A and bear upon the projected end $f$ of the lever D. The spring is fulcrumed at the point *i* by means of a screw *j*, which also takes into the chain-wheel F. By this construction it will be seen that a greater or less exertion may be applied on the lever D by the manipulation of the screw *h* and the adjustment of the spring on its fulcrum. I would have it understood that other forms of spring might be employed for normally holding the lever D in the desired position with respect to the curvilinear slot in the chain-wheel.

For the purpose of excluding dust, dirt, moisture, and the like I provide a guard J for the friction disk or wheel and the brake-band, which may be of metal or other suitable material and secured over the parts by any suitable means, and I provide a similar guard K for the spring and other parts, which I place on the outer side of the chain-wheel, as shown.

In operation it will be seen that as the pedal-levers are turned in the proper direction for propelling the wheel the bolt H will be forced down in the curvilinear slot *b* in the position shown in Fig. 1 of the drawings, which will cause the chain-wheel to be rotated and drive the chain, while at the same time said bolt will slacken the band or strap on the friction disk or wheel E. Now, then, should it be necessary to make a quick stop the most natural thing for the driver to do would be to check the movements of the pedals, and by a downward thrust of the pedal-lever D the bolt H will be forced upwardly in the slot of the chain-wheel. This will cause the said bolt to draw forcibly on the brake-band, bringing it in frictional contact with the disk or wheel E, which will cause a sudden stoppage of the wheel. It is obvious that a gradual stop may be effected by a gradual application of the foot upon the lever D.

It will be observed that my improvements are light and inexpensive. They can be applied to new wheels during the stage of manufacture at a very small expense, and such improvements can be applied to wheels at present in use without materially altering their construction.

Having described my invention, what I claim is—

The combination with the crank-shaft of the lever D, the slotted chain-wheel the friction-disk, the brake-band connecting the chain-wheel and lever and the spring adjustably secured to the chain-wheel and bearing upon said lever at its opposite end substantially as specified.

In testimony whereof I affix my signature in presence of two witnesses.

EDWARD JOSEPH DE BERGUE.

Witnesses:
WM. APPLEGATE,
JOHN J. SAUCIER.